United States Patent
Lin et al.

(10) Patent No.: US 9,584,239 B2
(45) Date of Patent: Feb. 28, 2017

(54) FILLING THE SPACE-TIME CHANNELS IN SDMA

(71) Applicant: Intel Corporation, Santa Clara, CA (US)

(72) Inventors: Xintian Lin, Mountain View, CA (US); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/219,271

(22) Filed: Mar. 19, 2014

(65) Prior Publication Data

US 2014/0269664 A1   Sep. 18, 2014

Related U.S. Application Data

(63) Continuation of application No. 12/584,780, filed on Sep. 10, 2009, now abandoned, which is a continuation of application No. 10/749,293, filed on Dec. 30, 2003, now abandoned.

(51) Int. Cl.
| | |
|---|---|
| *H04J 3/00* | (2006.01) |
| *H04B 7/06* | (2006.01) |
| *H04W 72/12* | (2009.01) |

(52) U.S. Cl.
CPC ............. *H04J 3/00* (2013.01); *H04B 7/0617* (2013.01); *H04B 7/0697* (2013.01); *H04W 72/1273* (2013.01)

(58) Field of Classification Search
CPC .......... H04W 72/046; H04W 28/0247; H04W 72/1273; H04B 7/0617; H04B 7/0697

USPC .......................................................... 370/345
See application file for complete search history.

(56) References Cited

U.S. PATENT DOCUMENTS

| | | | |
|---|---|---|---|
| 6,504,506 B1 | 1/2003 | Thomas et al. | |
| 6,662,024 B2 | 12/2003 | Walton et al. | |
| 6,721,302 B1 * | 4/2004 | Alastalo | H04L 1/0083 370/346 |
| 6,826,240 B1 | 11/2004 | Thomas et al. | |
| 6,870,808 B1 | 3/2005 | Liu et al. | |

(Continued)

FOREIGN PATENT DOCUMENTS

| | | |
|---|---|---|
| CN | 1371221 A | 9/2002 |
| EP | 1207661 A1 | 5/2002 |

(Continued)

OTHER PUBLICATIONS

Office Action received for corresponding Chinese Patent Application No. 201210209835.9, mailed on Apr. 3, 2014, 7 Pages of Office Action and 9 Pages of English Translation.

(Continued)

*Primary Examiner* — Faisal Choudhury
(74) *Attorney, Agent, or Firm* — Shichrur & Co.

(57) ABSTRACT

Embodiments of the present invention provide an Access Point (AP) to transmit and receive RF signals in a wireless local area network (WLAN), comprising, a processor to process the RF signals, a scheduler to schedule data packets that may have differing lengths for transmission to selected mobile stations, a Radio Frequency (RF) transceiver to receive and transmit the RF signals using space-time channels, and a code rate adjuster to adjust a code rate of Forward Error-Correction (FEC) codes in the packets to fill the space-time channels.

37 Claims, 4 Drawing Sheets

(56) References Cited

U.S. PATENT DOCUMENTS

| | | | |
|---|---|---|---|
| 6,965,774 B1 | 11/2005 | Kasapi et al. | |
| 6,999,771 B1 | 2/2006 | Kasapi et al. | |
| 7,095,717 B2 | 8/2006 | Muniere | |
| 7,248,879 B1 | 7/2007 | Walton et al. | |
| 7,286,513 B2 | 10/2007 | Nguyen | |
| 7,352,718 B1* | 4/2008 | Perahia | H04B 7/0413 370/210 |
| 7,394,858 B2 | 7/2008 | Sadowsky et al. | |
| 7,450,613 B2* | 11/2008 | Choi | H04L 1/0041 348/614 |
| 2001/0047424 A1* | 11/2001 | Alastalo | H04B 7/0842 709/236 |
| 2002/0051430 A1 | 5/2002 | Kasami et al. | |
| 2002/0128027 A1 | 9/2002 | Wong et al. | |
| 2002/0181492 A1 | 12/2002 | Kasami et al. | |
| 2003/0096617 A1* | 5/2003 | Miller, II et al. | 455/452 |
| 2003/0128658 A1 | 7/2003 | Walton et al. | |
| 2003/0203723 A1* | 10/2003 | Persson | H04B 17/309 455/132 |
| 2003/0214928 A1 | 11/2003 | Chuah | |
| 2003/0227914 A1 | 12/2003 | Nguyen | |
| 2003/0235147 A1* | 12/2003 | Walton | H04B 7/04 370/204 |
| 2004/0136349 A1 | 7/2004 | Walton et al. | |
| 2004/0145530 A1 | 7/2004 | Foore et al. | |
| 2005/0043031 A1 | 2/2005 | Cho et al. | |
| 2005/0063378 A1 | 3/2005 | Kadous | |
| 2005/0111376 A1 | 5/2005 | Raghothaman et al. | |
| 2005/0129068 A1 | 6/2005 | Ginzburg et al. | |
| 2005/0138199 A1 | 6/2005 | Li et al. | |
| 2005/0141495 A1* | 6/2005 | Lin et al. | 370/389 |
| 2005/0163103 A1 | 7/2005 | Malomsoky et al. | |
| 2006/0039312 A1 | 2/2006 | Walton et al. | |
| 2007/0081498 A1 | 4/2007 | Niwano | |

FOREIGN PATENT DOCUMENTS

| | | | | |
|---|---|---|---|---|
| WO | WO/02/41647 | * | 5/2002 | H04L 12/28 |
| WO | 02/063836 A2 | | 8/2002 | |
| WO | 2005/067219 A2 | | 7/2005 | |
| WO | 2005/067219 A3 | | 12/2005 | |

OTHER PUBLICATIONS

Jacob et al., "MAC Protocol Enhancements and a Distributed Scheduler for QoS Guarantees over the IEEE 802.11 Wireless LANs", 2002 IEEE 56th Vehicular Tech Conference Proceedings, Vancouver, Canada, Sep. 24-28, 2002, vol. 1 of 4 XP010608866.
Mangold, Stefan. "802.11 ale and Hiper LAN/2: Coexistence and Interworking Using Enhanced PCF", European Telecommunications Standards Institute, Jan. 29, 2001, pp. 1-11, XP002347265.
Wireless LAN Medium Access Control (MAC) and Physical Layer (PHY) Specifications (ISO/IEC 8802-11: 1999), ISO/IEC 8802-11 ANSI/IEEE STD 802.11, 1999, XP002347266, pp. 70-97.
Sheu et al.. "Providing Multiple Data Rates in Infrastructure Wireless Networks", Globecom'01, 2001 IEEE Global Telecommunications Conference San Antonio, TX, Nov. 25-29, 2001, vol. 3 of 6, XP001 054904.
International Search Report and Written Opinion received for PCT Patent Application No. PCT/US2004/043340, Nov. 16, 2005, 20 pages.
Vornefeld, U, "Packet Scheduling in SDMA Based Wireless Networks", Vehicular Tech Cont., 2000, IEEE, vol. 5, Sep. 24, 2000, pp. 2132-2139.
Office Action received for U.S. Appl. No. 10/749,293, mailed on Dec. 12, 2007, 12 pages.
Office Action received for U.S. Appl. No. 10/749,293, mailed on Nov. 17, 2008, 12 pages.
Office Action received for U.S. Appl. No. 10/749,293, mailed on Apr. 27, 2009, 11 pages.
Office Action received for U.S. Appl. No. 10/749,293, mailed on Jun. 19, 2009, 11 pages.
Office Action received for U.S. Appl. No. 10/749,293, mailed on Oct. 13, 2009, 9 pages.
Office Action received for U.S. Appl. No. 10/749,293, mailed on Feb. 23, 2010, 11 pages.
Office Action received for U.S. Appl. No. 12/584,780, mailed on Jun. 5, 2012, 12 pages.
Office Action received for corresponding Chinese Patent Application No. 200480039593.7, mailed on Apr. 14, 2008, 7 Pages of Office Action and 14 Pages of English Translation.
Office Action received for corresponding Chinese Patent Application No. 200480039593.7, mailed on Dec. 4, 2009, 10 Pages of Office Action and 20 Pages of English Translation.
Office Action received for corresponding Chinese Patent Application No. 200480039593.7, mailed on Jul. 6, 2011, 4 Pages of Office Action and 7 Pages of English Translation, 11 pages.
Office Action received for corresponding European Patent Application No. 04815418.1, mailed on May 14, 2007, 4 Pages of Office Action.
Written Opinion received for Singapore Patent Application No. 200603277-5, mailed on May 15, 2008, 7 pages.
Office Action received for corresponding U.S. Appl. No. 12/584,780, mailed on Nov. 9, 2011, 10 pages.
International Preliminary Report on Patentability received for PCT Patent Application No. PCT/US2004/043340, Jul. 13, 2006, 13 pages.
Office Action received for U.S. Appl. No. 12/584,144, mailed on Sep. 27, 2012, 15 pages.
Office Action received for U.S. Appl. No. 12/584,144, mailed on Nov. 2, 2012, 14 pages.
Notice of Allowance received for U.S. Appl. No. 12/584,144, mailed on Mar. 20, 2013, 9 pages.
Office Action received for U.S. Appl. No. 12/584,144, mailed on Nov. 24, 2009, 10 pages.
Office Action received for U.S. Appl. No. 12/584,144, mailed on Sep. 15, 2010, 9 pages.
Office Action received for U.S. Appl. No, 12/584,144, mailed on May 13, 2011, 15 pages.
Office Action received for U.S. Appl. No. 12/584,144, mailed on Apr. 12, 2012, 18 pages.
Office Action received for U.S. Appl. No. 12/584,144, mailed on Apr. 28, 2010, 11 pages.
Office Action received for U.S. Appl. No. 12/584,144, mailed on Jan. 20, 2011, 10 pages.
Office Action received for U.S. Appl. No. 12/584,144, mailed on Nov. 22, 2011, 17 pages.
Office Action received for Chinese Patent Application No. 201210209835.9, mailed on Feb. 2, 2015, 3 Pages of Office Action and 5 Pages of English Translation.
Office Action of Chinese Patent Application No. 201210209835.9, mailed Sep. 6, 2015, 7 pages (including 4 pages of English translation).
Office Action for European Patent Application Serial No. 04 815 418.1, mailed on Aug. 4, 2015, 6 pages.
Office Action received for Chinese Patent Application No. 201210209835.9, mailed on May 27, 2015, 3 Pages of Office Action and 2 Pages of English Translation.
Office Action for Chinese Patent Application Serial No. 201210209835.9, mailed on May 3, 2016, 7 pages, (Including 4 pages of English translation).

* cited by examiner

FILLING THE SPACE-TIME CHANNELS IN SDMA

CROSS-REFERENCE TO RELATED APPLICATIONS

This application is a continuation application of Ser. No. 12/584,780 filed Sep. 10, 2009, entitled "FILLING THE SPACE-TIME CHANNELS IN SDMA", which was a continuation application of Ser. No. 10/749,293 filed Dec. 30, 2003, entitled "FILLING THE SPACE-TIME CHANNELS IN SDMA".

BACKGROUND

Spatial-Division Multiple-Access (SDMA) is a technique that allows multiple independent transmissions between a wireless Access Point (AP) having multiple antennas and other wireless devices (mobile stations). SDMA provides a performance advantage by enabling the access point to transmit and receive signals to/from multiple stations simultaneously using different spatial channels, which increases throughput of the existing Wireless Local Area Networks (WLANs). However, a need exists for SDMA to mitigate unused channels in uplinks and downlinks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
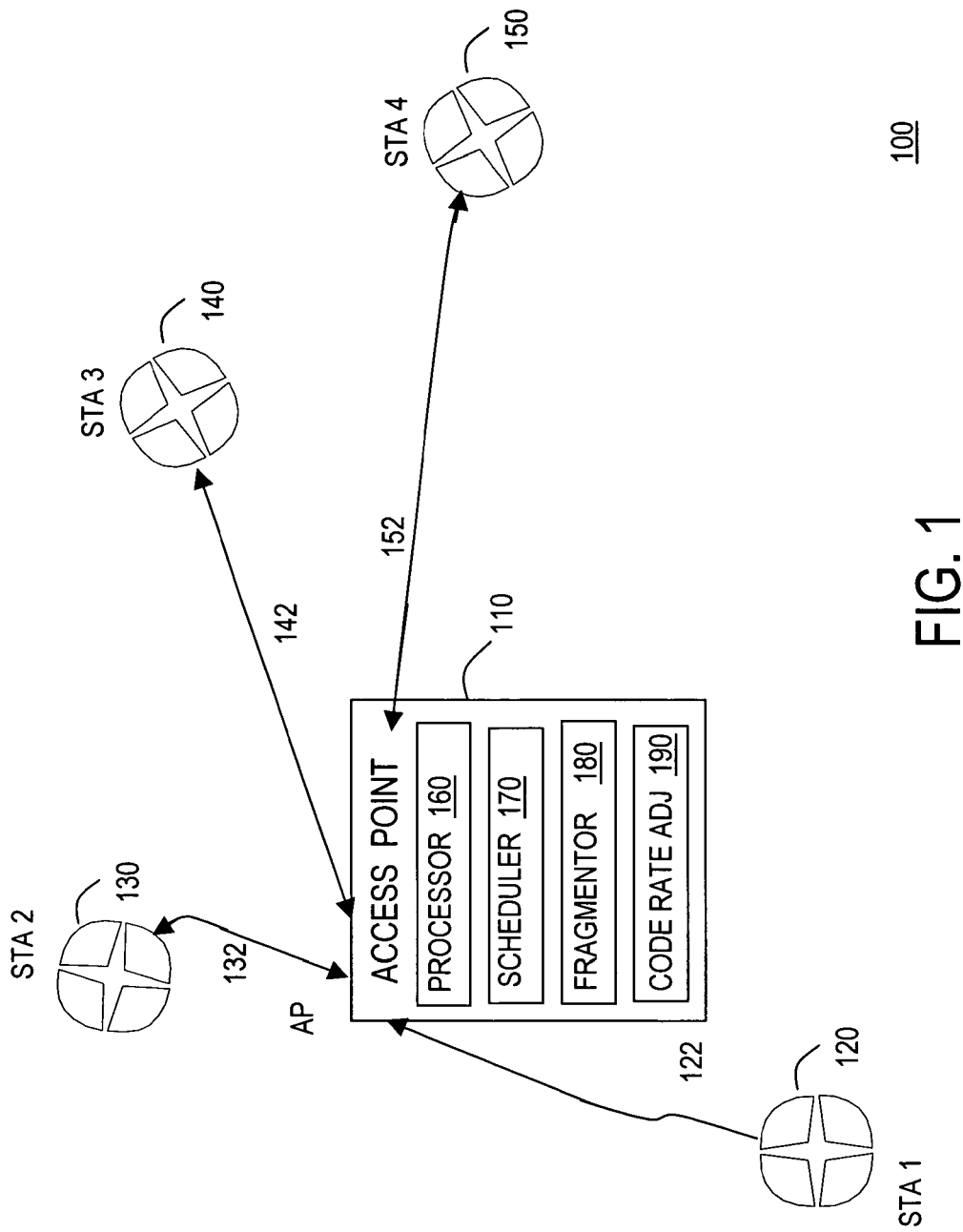
FIG. 1 illustrates a network that includes an Access Point (AP) and mobile stations.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a network 100 that includes an Access Point (AP) 110 and mobile stations (STAs) 120, 130, 140 and 150. In some embodiments, wireless network 100 is a Wireless Local Area Network (WLAN). For example, one or more of mobile stations 120, 130, 140 and 150 and access point 110 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Mobile stations 120, 130, 140 and 150 may be any type of terminal or mobile station capable of communicating in network 100. For example, the mobile stations may be computers, personal digital assistants, wireless-capable cellular phones, home audio or video appliances, or the like.

Access point 110 communicates with mobile station 120 (also referred to as "STA1") using signal 122. Access point 110 may also communicate with mobile station 130 (also referred to as "STA2") using signal 132, mobile station 140 (also referred to as "STA3") using signal 142 and mobile station 150 (also referred to as "STA4") using signal 152. Signals 122, 132, 142 and 152 are transmitted through a wireless channel in free space between access point 110 and the various mobile stations.

Access point 110 includes a processor 160 and a Radio Frequency (RF) transceiver to receive and transmit modulated signals from one or more antennas. The analog front end transceiver may be provided as a stand-alone integrated analog circuit, or alternatively, be embedded with processor 160 as a mixed-mode integrated circuit. The received modulated signals are frequency down-converted, filtered, and converted to digital signals. Access point 110 also includes a scheduler 170, a fragmentor 180 and a code rate adjuster 190 whose features are further described herein.

Figure 2:
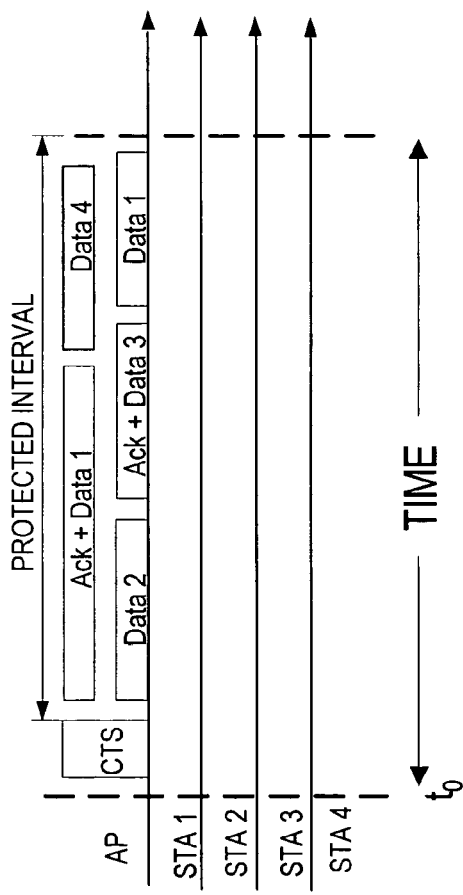
FIG. 2 illustrates a protocol in accordance with the present invention for downlink transmissions.

FIG. 2 illustrates a protocol in accordance with the present invention for downlink transmissions. Channel access marks the beginning of the bi-directional communications between the access point and a mobile station. The channel is accessed by the access point sending a Clear-To-Send (CTS) frame that broadcasts a protected time interval, but other schemes to broadcast a protected time interval may be applied. The protected time interval is announced by access point 110 such that no mobile station contends for the medium during that time interval. The time interval length may be equal to the length of a buffered packet as long as the transmission opportunity (TXOP) in the 802.11e standard, or another time period without limiting the present invention. Access point 110 fills the M spatial channels using the data packets buffered for all stations. Note that this feature is in contrast to conventional Spatial-Division Multiple-Access (SDMA) systems where the access point fills the M channels only using packets buffered for M stations.

Thus, in the SDMA downlink and prior to time $t_0$, access point 110 selects mobile stations that have buffered data. Scheduler 170 (see FIG. 1) schedules data packets that may have differing lengths for transmission to the selected mobile stations, and as shown, arranges those data packets based on transmission times to send on each of the spatial channels. One feature of scheduler 170 is that the system resources of SDMA are efficiently utilized by accounting for the differences in packet lengths to fill the spatial channels by signals in time. Accordingly, the features of scheduler 170 significantly improve the throughput of SDMA on the spatial channels during the protected time interval (beginning at time $t_0$) where data packets are transmitted to the mobile stations.

Scheduler 170 fills M spatial channels by scheduling the traffic for M stations at any time instant, where M is a constant less than or equal to the number of antennas N at the access point. For simplicity of description and by way of example, N antennas may form M spatial channels for M stations at any time instant. The system network 100 throughput is dramatically increased when scheduler 170 fills the M spatial channels at all times. The algorithm of scheduler 170 operates to maximize the usage of the M channels, maximize the total throughput of the M channels, minimize the average bit-error rates that may be affected by the interference between spatial channels, and minimize the average latency.

In accordance with one aspect of the present invention, adaptive antenna arrays are used in conjunction with a beam forming algorithm to achieve spatial diversity within each spatial cell and implement SDMA. That is, signals output by the antennas are directionally formed by selectively energizing different antenna sensors with different signal gains so that remote terminals or mobile stations in one portion of a spatial cell may communicate with access point 110 while other remote mobile stations in a different portion of the spatial cell may communicate with the same access point, even if they are using the same tone set and code.

In another aspect of the present invention, access point 110 in the SDMA downlink first selects a group of mobile stations having buffered data, and then forms spatial channels using the adaptive antenna arrays to send data to the mobile stations. To transmit data on the spatial channels, the access point retrieves the antenna resources to form that spatial channel, with capabilities to form new channels for a waiting mobile station developed on the fly.

In particular, the access point broadcasts a clear-to-send (CTS) packet to hold the medium for a certain duration. Data packets are then sent to mobile stations 120, 130, 140 and 150 using only two spatial channels at any time instant. In the illustrated downlink example, the scheduler 170 designates two data packets, i.e., labeled Ack+Data 1 and Data 1, for mobile station 120. Scheduler 170 does not place the data packets into two spatial channels at the same time since mobile station 120 may not be equipped with multiple antennas to receive the two packets simultaneously. Therefore, scheduler 170 does not exchange the position of the latter data packet labeled Data 1 with either the data packet labeled Data 2 or the data packet labeled Ack+Data 3. Furthermore, to improve channel efficiency and increase throughput, the algorithm of scheduler 170 does not exchange the data packet labeled Data 1 with the data packet labeled Data 4.

Figure 3:
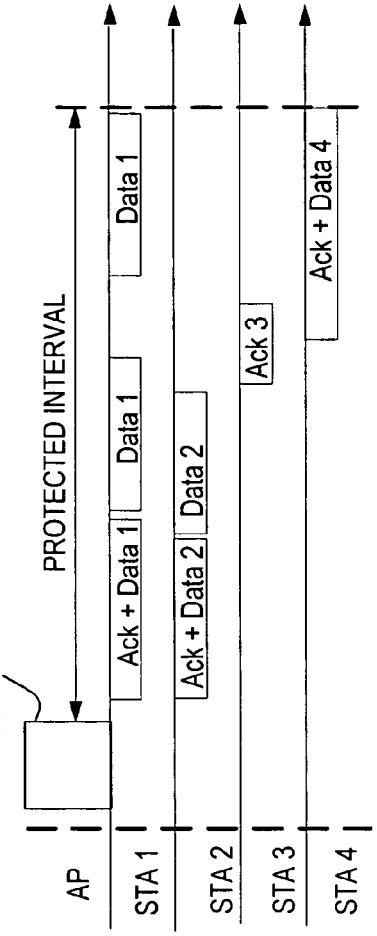
FIG. 3 illustrates a protocol that includes an access point generated schedule for uplink transmissions in accordance with the present invention.

FIG. 3 illustrates a protocol that includes an access point generated schedule for uplink transmissions in accordance with the present invention. In the uplink, scheduler 170 first schedules the transmission intervals for different mobile stations according to the traffic information about the stations such as, for example, packet size, queue size and priority. This information may be acquired by access point 110 through polling or piggy-back feedback from mobile stations 120, 130, 140 and 150. The optimization goals of scheduler 170 are the same as those listed for the downlink. As shown in the figure, the access point broadcasts the schedule to all the mobile stations and listens to the uplink packets. The acknowledgements of the uplink data packets may be sent in normal downlink packets.

The access point broadcasts the schedule packet in order to both announce the transmission opportunities (or intervals) and hold the medium for a certain duration. After the broadcasted schedule is received by mobile stations 120, 130, 140 and 150, the addressed stations respond by sending their data packets within the specified intervals. Mobile station 120 (STA1) is assigned two time intervals and that station sends two packets in the first interval and one packet in the second interval. Access point 110 may broadcast the schedule using an omni-directional antenna, since the schedule is directed collectively to mobile stations 120, 130, 140 and 150, and there are only two spatial channels available at each time instant.

Figure 4:
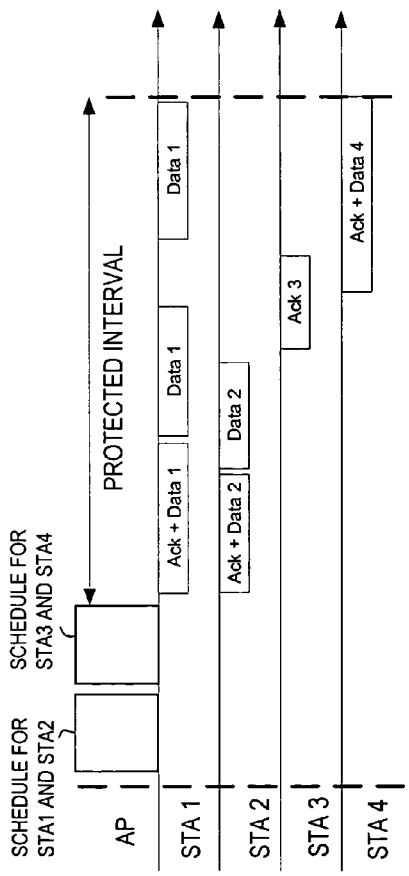
FIG. 4 illustrates a protocol that includes multiple schedules generated by an access point for uplink transmissions in accordance with the present invention.

FIG. 4 illustrates a protocol that includes multiple schedules generated by access point 110 for uplink transmissions in accordance with the present invention. If the omni-directional antenna can not reach mobile stations based on distance, several schedule packets instead of one may be sent through spatial channels with higher antenna gains. The figure illustrates an example for two schedule packets, where the first schedule packet is prepared for mobile stations 120 (STA1) and 130 (STA2) and the second schedule packet is prepared for mobile stations 140 (STA3) and 150 (STA4). In other words, the first schedule packet schedules the uplink time interval using spatial channels pointed to STA1 and STA2, and the second schedule packet schedules the uplink time interval using spatial channels pointed to STA3 and STA4.

Figure 5:
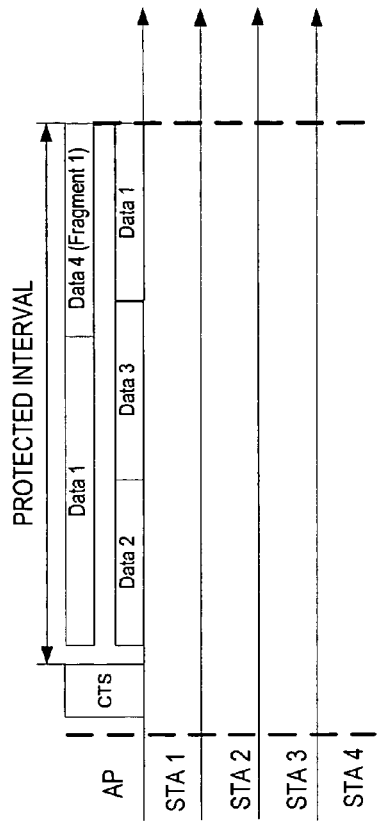
FIG. 5 illustrates a transmission that incorporates fragmentation at the end of a protected interval.

FIG. 5 illustrates a transmission of data packets that incorporates fragmentation at the end of a protected interval to improve the channel efficiency. The fragmentor 180 in access point 110 (see FIG. 1) and a fragmentor unit in mobile stations 120, 130, 140 and 150 may employ fragmentation to completely fill the space-time channels in the downlink. For example, the access point may fill the channels of data packets next to each other and fragment some packets at the end of the protected interval, although this is not a limitation of the present invention. As shown in the figure, the data packet prepared for mobile station 150 (STA4) is fragmented to fit the protected interval. Note that since data packets Data 2 and Data 3 are sent to different mobile stations through different spatial channels, they are placed next to each other and do not need to be separated by a Short Inter-Frame Spacing (SIFS).

Figure 6:
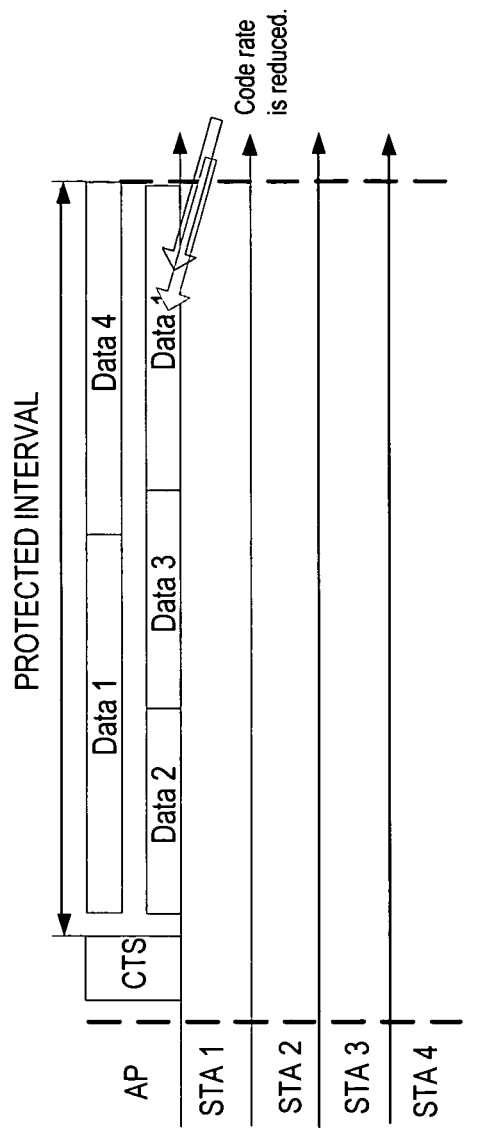
FIG. 6 illustrates a transmission that incorporates a code rate adjustment at the end of a protected interval.

FIG. 6 illustrates a data packet transmission that incorporates a code rate adjustment at the end of a protected interval. Code rate adjustment changes the code rates of the Forward Error-Correction (FEC) codes in the packets and may be employed to fill the space-time channels. Code rate adjustment can be applied to multiple packets within the protected interval. Note that a higher code rate may increase the chance that the packet gets lost, while the lower code rate may increase the length of the data packets. The access point and the mobile stations may adjust the packet length by changing the code rate and making the appropriate tradeoffs. Since the access point usually is not power critical, reducing the code rate to fill the channels may be desired. As illustrated in the figure, the code rate of the latter Data 1 packet has been reduced such that its reliability is increased without reducing the system throughput.

By now it should be apparent that a Medium Access Control (MAC) protocol may be used to enhance the efficiency of SDMA systems in accordance with features of the present invention, such features including fragmentation, data traffic scheduling, adding error rate control bits and retrieving antenna resources to form spatial channels developed on the fly.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless device to transmit and receive Radio Frequency (RF) signals using space-time channels in a wireless network, the wireless device comprising:
    a processor to process digital signals converted to and from the RF signals;
    a scheduler circuit to schedule variable length data packets having differing lengths for transmission to selected mobile stations in the wireless network, the scheduler circuit configured to schedule the variable length data packets for transmission based on transmission times to simultaneously transmit on a number of spatial channels to the mobile stations by filling the number of spatial channels using data packets buffered for all stations, the scheduler circuit being configured to buffer for a number of stations greater than the number of the spatial channels;
    an RF transceiver to receive and transmit the RF signals using the space-time channels by using an adaptive antenna array with a beamforming algorithm to achieve spatial diversity; and
    a fragmentor circuit component configured to fragment and a code rate adjuster circuit component configured to adjust code rates of Forward-Correction (FEC) codes, to adjust the size of the data packets,
    wherein the packets are either fragmented or the code rate is adjusted or both in order to optimally fill the space-time channels with fragmented and variable FEC length data packets,
    and wherein the number of spatial channels is a constant greater than zero and less than or equal to a number of antennas at a base station, and wherein the wireless device is configured to send multiple schedules in a protected time interval to the mobile stations.

2. The wireless device of claim 1, wherein the transmission of the RF signals are from one or more antennas.

3. The wireless device of claim 1, wherein the transmission and reception of the RF signals use Spatial-Division Multiple-Access (SDMA) to allow multiple independent transmissions between the wireless device and the selected mobile stations.

4. The wireless device of claim 3, wherein the wireless device operates using multi-user multiple input multiple output (MU MIMO) SDMA channels.

5. A Mobile Station (STA) to transmit and receive Radio Frequency (RF1) signals in a wireless network, comprising:
    a processor to process digital signals converted from the RF signals; and
    an RF transceiver to receive from a wireless device variable length data packets having differing lengths in space-time channels, the variable length data packets scheduled based on transmission times to simultaneously transmit on a number of spatial channels filled using data packets buffered for all stations, including the mobile station, wherein the number of spatial channels is a constant greater than zero and less than or equal to a number of antennas at a base station, the variable length data packets scheduled in a protected time interval,
    and wherein the received data packets are received from space-time channels filled by fragmented data packets and data packets with length adjusted by adjusting Forward-Correction (FEC) codes, spatial diversity of the space-time channels is achieved by an adaptive antenna array with a beamforming algorithm.

6. The STA of claim 5, wherein the reception of the RF signals are from one or more antennas.

7. The STA of claim 6, wherein the transmission and reception of the RF signals use Spatial-Division Multiple-Access (SDMA) to allow multiple independent transmissions between the STA and the wireless device.

8. The STA of claim 7, wherein the STA operates using multi-user multiple input multiple output (MU MIMO) SDMA channels.

9. An integrated circuit (IC) operable in a wireless device to transmit and receive Radio Frequency (RF) signals in a wireless network using space-time channels to selected mobile stations, the IC comprising:
    a scheduler circuit component to schedule variable length data packets having differing lengths for transmission to selected mobile stations in the wireless network, the scheduler circuit component configured to schedule the variable length data packets for transmission based on transmission times to simultaneously transmit on a number of spatial channels to the mobile stations by filling the number of spatial channels using data packets buffered for all stations; and
    a fragmentor circuit component and a code rate adjuster circuit component configured to adjust the size of the variable length data packets and adjust the code rates of Forward-Correction (FEC) codes,
    wherein the variable length data packets are either fragmented or the code rate is adjusted or both in order to optimally fill the space-time channels with segmented and FEC adjusted data packets to be transmitted to the selected mobile stations, the IC to achieve spatial diversity using a beamforming algorithm in conjunction with an adaptive antenna array,
    and wherein the number of spatial channels is a constant greater than zero and less than or equal to a number of antennas at a base station, and wherein the wireless device is configured to send multiple schedules in a protected time interval to the mobile stations.

10. The IC of claim 9 wherein the IC is configured to be operable with an RF transceiver to receive and transmit the RF signals using the space-time channels.

11. The IC of claim 10, wherein transmission and reception of the RF signals using Spatial-Division Multiple-Access (SDMA) to allow multiple independent transmissions between the wireless device and the selected mobile stations.

12. The IC of claim 9, wherein the wireless device operates using multiple user multiple input multiple output (MU MIMO) SDMA channels.

13. A method of transmitting and receiving Radio Frequency (RF) signals in a wireless network using space-time channels, the method comprising:
    filling space-time channels with fragmented data packets that are to be sent to selected mobile stations in a wireless network;

adjusting the code rates of Forward-Correction (FEC) codes to vary a length of the data packets;
scheduling the data packets, having variable lengths, for transmission from a wireless device to the selected mobile stations, based on transmission times to simultaneously transmit on a number of spatial channels to the mobile stations by filling the number of spatial channels using data packets buffered for all stations,
wherein the number of spatial channels is a constant greater than zero and less than or equal to a number of antennas at a base station;
sending multiple schedules in a protected time interval to the mobile stations; and
transmitting the data packets using the space-time channels by using an adaptive antenna array with a beamforming algorithm to achieve spatial diversity.

14. The method of claim 13, further comprising transmitting the RF signals from one or more antennas.

15. The method of claim 14, further comprising using Spatial-Division Multiple-Access (SDMA) to allow multiple independent transmissions between the wireless device and the selected mobile stations.

16. The method of claim 15, further comprising using multiuser multiple input multiple output (MU MIMO) SDMA channels.

17. A wireless communication system, comprising:
a mobile station; and
a wireless device to communicate with the mobile station using space-time channels in a wireless network, the wireless device comprising:
a processor to process digital signals converted from Radio Frequency (RF) signals;
a fragmentor circuit component and a code rate adjuster circuit component to adjust the size of data packets and adjust the code rates of Forward-Correction (FEC) codes;
wherein the data packets are either fragmented or the code rate is adjusted or both in order to optimally fill the space-time channels using fragmented data and FEC optimized packets; and
a scheduler circuit to schedule the data packets, having differing lengths, for transmission to selected mobile stations including the mobile station, the scheduler circuit configured to schedule the variable length data packets for transmission based on transmission times to simultaneously transmit on a number of spatial channels to the mobile stations by filling the number of spatial channels using data packets buffered for all stations, the scheduler circuit being configured to buffer for a number of stations greater than the number of the spatial channels, the wireless device configured to achieve spatial diversity using an adaptive antenna array with a beamforming algorithm,
wherein the number of spatial channels is a constant greater than zero and less than or equal to a number of antennas at a base station, and wherein the wireless device is configured to send multiple schedules in a protected time interval to the mobile stations.

18. At least one non-transitory computer-readable storage medium comprising a set of instructions that, in response to being executed on a computing device, cause the computing device to:
fill space-time channels with fragmented data packets that are to be sent to selected mobile stations;
adjust code rates of Forward-Correction (FEC) codes to vary a length of the data packets to efficiently fill the space-time channels;
schedule the data packets, having variable lengths, for transmission to the selected mobile stations, based on transmission times to simultaneously transmit on a number of spatial channels to the mobile stations by filling the number of spatial channels using data packets buffered for all stations, wherein the number of spatial channels is a constant greater than zero and less than or equal to a number of antennas at a base station;
send multiple schedules in a protected time interval to the mobile stations; and
transmit the FEC optimized data packets using the space-time channels by using an adaptive antenna array with a beamforming algorithm to achieve spatial diversity.

19. The at least one non-transitory computer-readable storage medium of claim 18, wherein the space-time channels are completely filled with segmented data packets.

20. An Access Point (wireless device) to transmit and receive Radio Frequency (RF)signals using space-time channels in a wireless network, comprising:
a processor to process digital signals converted to and from the RF signals;
a scheduler circuit to schedule variable length data packets having differing lengths for transmission to selected mobile stations, the scheduler circuit capable of scheduling system resources that use spatial divisional multiple access (SDMA), the scheduler circuit configured to schedule the variable length data packets for transmission based on transmission times to simultaneously transmit on a number of spatial channels to the mobile stations by filling the number of spatial channels using data packets buffered for all stations;
an RF transceiver to receive and transmit the RF signals using space-time channels by using an adaptive antenna array with a beamforming algorithm to achieve spatial diversity, wherein the data packets are fragmented and FEC adjusted to fit a protected time interval; and
a number of antennas to form the number of spatial channels for a number of stations at any time instant, wherein the number of spatial channels is a constant greater than zero and less than or equal to the number of antennas, and wherein the AP is configured to send multiple schedules in a protected time interval to the mobile stations.

21. The AP of claim 20, wherein the fragmented data packets are used to fill the space-time channels.

22. The AP of claim 20, wherein the transmission and reception of the RF signals use Spatial-Division Multiple-Access (SDMA) to allow multiple independent transmissions between the wireless device and the selected mobile stations.

23. The AP of claim 20, wherein the AP operates using multi-user multiple input multiple output (MU MIMO) SDMA channels.

24. A Mobile Station (STA) to transmit and receive Radio Frequency (RF) signals in a wireless network, comprising:
a processor to process digital signals converted from the RF signals; and
an RF transceiver to receive from an Access Point (wireless device) variable length data packets having differing lengths in space-time channels, the variable length data packets scheduled based on transmission times to simultaneously transmit on a number of spatial channels filled using data packets buffered for all stations, including the mobile station, the variable length data packets scheduled in a protected time interval, wherein the number of spatial channels is a constant greater than zero and less than or equal to a number of antennas at a base station, and wherein the received data packets are received from space-time channels filled by fragmented data packet, and wherein packet length is adjusted by adjusting the code rate of forward error-correction (FEC) associated with the data packets, and spatial diversity of the space-time channels is achieved by an adaptive antenna array with a beamforming algorithm.

25. The STA of claim 24, wherein the reception of the RF signals are from one or more antennas.

26. The STA of claim 25, wherein the transmission and reception of the RF signals use Spatial-Division Multiple-Access (SDMA) to allow multiple independent transmissions between the STA and wireless device.

27. The STA of claim 26, wherein the STA operates using multi-user multiple input multiple output (MU MIMO) SDMA channels.

28. An integrated circuit (IC) operable in an Access Point (wireless device) to transmit and receive Radio Frequency (RF) signals in a wireless network using space-time channels to selected mobile stations, the IC comprising:
a scheduler circuit component to schedule variable length data packets having differing lengths for transmission to selected mobile stations in the wireless network, the scheduler circuit component configured to schedule the variable length data packets for transmission based on transmission times to simultaneously transmit on a number of spatial channels to the mobile stations by filling the number of spatial channels using data packets buffered for all stations; and
a fragmentor circuit component and a code rate adjuster circuit component configured to adjust the size of the data packets and adjust the code rates of Forward-Correction (FEC) codes,
wherein the data packets are either fragmented or the code rate is adjusted or both in order to optimally fill the space-time channels with segmented and FEC optimized data packets to be transmitted to the selected mobile stations, and wherein spatial diversity of the space-time channels is achieved by an adaptive antenna array with a beamforming algorithm,
and wherein the number of spatial channels is a constant greater than zero and less than or equal to a number of antennas at a base station, and wherein the IC is configured to cause the Access Point to send multiple schedules in a protected time interval to the mobile stations.

29. The IC of claim 28 wherein the IC is configured to be operable with an RF transceiver to receive and transmit the RF signals using the space-time channels.

30. The IC of claim 29, wherein transmission and reception of the RF signals use Spatial-Division Multiple-Access (SDMA) to allow multiple independent transmissions between the wireless device and the selected mobile stations.

31. The IC of claim 28, wherein the AP operates using multiple user multiple input multiple output (MU MIMO) SDMA channels.

32. A method of transmitting and receiving Radio Frequency (RF)signals in a wireless network using space-time channels, the method comprising:
using space-time channels with fragmented data packets and forward error-correction (FEC) optimized packets that are to be sent to selected mobile stations;
scheduling the data packets, having variable lengths, for transmission from an Access Point to the selected mobile stations, based on transmission times to simultaneously transmit on a number of spatial channels to the mobile stations by filling the number of spatial channels using data packets buffered for all stations,
wherein the number of spatial channels is a constant greater than zero and less than or equal to a number of antennas at a base station;
sending multiple schedules in a protected time interval to the mobile stations; and
transmitting the data packets using the space-time channels by using an adaptive antenna array with a beamforming algorithm to achieve spatial diversity.

33. The method of claim 32, further comprising transmitting the RF signals from one or more antennas.

34. The method of claim 33, further comprising using Spatial-Division Multiple-Access (SDMA) to allow multiple independent transmissions between the wireless device and the selected mobile stations.

35. The method of claim 34, further comprising using multi-user multiple input multiple output (MU MIMO) SDMA channels.

36. A wireless communication system, comprising:
a mobile station; and
an Access Point (wireless device) to communicate with the mobile station using space-time channels in a wireless network, the wireless device comprising:
a processor to process digital signals converted from Radio Frequency (RF) signals, wherein the space-time channels use fragmented data packets, and wherein the space-time channels use adjustable code rates to optimize the space-time channels; and
a scheduler circuit to schedule variable length data packets having differing lengths for transmission to selected mobile stations including the mobile station, the scheduler circuit configured to schedule the variable length data packets for transmission based on transmission times to simultaneously transmit on a number of spatial channels to the mobile stations by filling the number of spatial channels using data packets buffered for all stations, the scheduler circuit being configured to buffer for a number of stations greater than the number of the spatial channels, the Access Point configured to achieve spatial diversity using an adaptive antenna array with a beamforming algorithm,
wherein the number of spatial channels is a constant greater than zero and less than or equal to a number of antennas at a base station, and wherein the Access Point is configured to send multiple schedules in a protected time interval to the mobile stations.

37. An apparatus, comprising:
a processor to process digital signals; and
logic, at least a portion of which is in hardware, the logic to fill the space-time channels with fragmented data packets to be transmitted to selected mobile stations, wherein the logic is to schedule variable length data packets having differing lengths for transmission to the selected mobile stations based on transmission times to simultaneously transmit on a number of spatial channels to the mobile stations by filling the number of spatial channels using data packets buffered for all stations, spatial diversity is achieved using an adaptive antenna array with a beamforming algorithm,
wherein the logic is configured to buffer for a number of stations greater than the number of the spatial channels, and wherein the number of spatial channels is a constant greater than zero and less than or equal to a number of antennas at a base station, and wherein the logic is configured to cause sending multiple schedules in a protected time interval to the mobile stations.

* * * * *